(12) United States Patent
Newcombe et al.

(10) Patent No.: US 9,498,740 B2
(45) Date of Patent: *Nov. 22, 2016

(54) WASHBOX

(75) Inventors: Remembrance Louisa Newcombe, Coeur d'Alene, ID (US); David G. Volkenand, Hayden, ID (US); Mark S. Lopp, Coeur d'Alene, ID (US)

(73) Assignee: BLUE WATER TECHNOLOGIES, INC., Hayden, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,311

(22) Filed: Jun. 18, 2012

(65) Prior Publication Data

US 2013/0118990 A1 May 16, 2013

Related U.S. Application Data

(60) Continuation of application No. 13/005,415, filed on Jan. 12, 2011, now Pat. No. 8,206,599, which is a division of application No. 11/858,079, filed on Sep. 19, 2007, now Pat. No. 7,897,040.

(51) Int. Cl.
*B01D 24/46* (2006.01)
*B01D 21/30* (2006.01)
*F16K 21/18* (2006.01)
*B01D 24/30* (2006.01)
*B01D 39/16* (2006.01)

(52) U.S. Cl.
CPC ........... *B01D 24/4689* (2013.01); *B01D 24/30* (2013.01); *B01D 24/305* (2013.01); *B01D 24/4668* (2013.01); *B01D 39/1638* (2013.01); *Y10T 137/0318* (2015.04); *Y10T 137/8593* (2015.04)

(58) Field of Classification Search
USPC ....... 210/106, 137, 189, 269, 676, 792, 807, 210/675, 793; 137/386
See application file for complete search history.

(56) References Cited

U.S. PATENT DOCUMENTS

| | | | |
|---|---|---|---|
| 4,246,102 A | 1/1981 | Hjelmner | |
| 4,867,872 A * | 9/1989 | Russell et al. | ................ 210/104 |
| 5,454,959 A | 10/1995 | Stevens | |
| 5,520,804 A | 5/1996 | Ward | |
| 5,611,921 A * | 3/1997 | Deskins | .................... 210/195.1 |
| 6,251,294 B1 | 6/2001 | Davis et al. | |
| 6,387,283 B1 * | 5/2002 | Lind | ............................. 210/786 |
| 6,517,712 B2 | 2/2003 | Xia et al. | |
| 6,790,351 B2 | 9/2004 | Xia et al. | |
| 7,381,336 B2 | 6/2008 | Stedman | |
| 7,897,040 B2 | 3/2011 | Newcombe | |
| 8,206,599 B2 | 6/2012 | Newcombe | |
| 2005/0077247 A1 * | 4/2005 | Stedman | ....................... 210/741 |
| 2005/0269254 A1 * | 12/2005 | Roitman | ....................... 210/252 |
| 2011/0100888 A1 | 5/2011 | Newcombe | |

FOREIGN PATENT DOCUMENTS

WO    WO2006/100611    * 2/2006

* cited by examiner

*Primary Examiner* — Nam Nguyen
*Assistant Examiner* — Richard Gurtowski
(74) *Attorney, Agent, or Firm* — Perkins Coie LLP

(57) ABSTRACT

Exemplary systems and methods relating to washboxes are described.

21 Claims, 8 Drawing Sheets

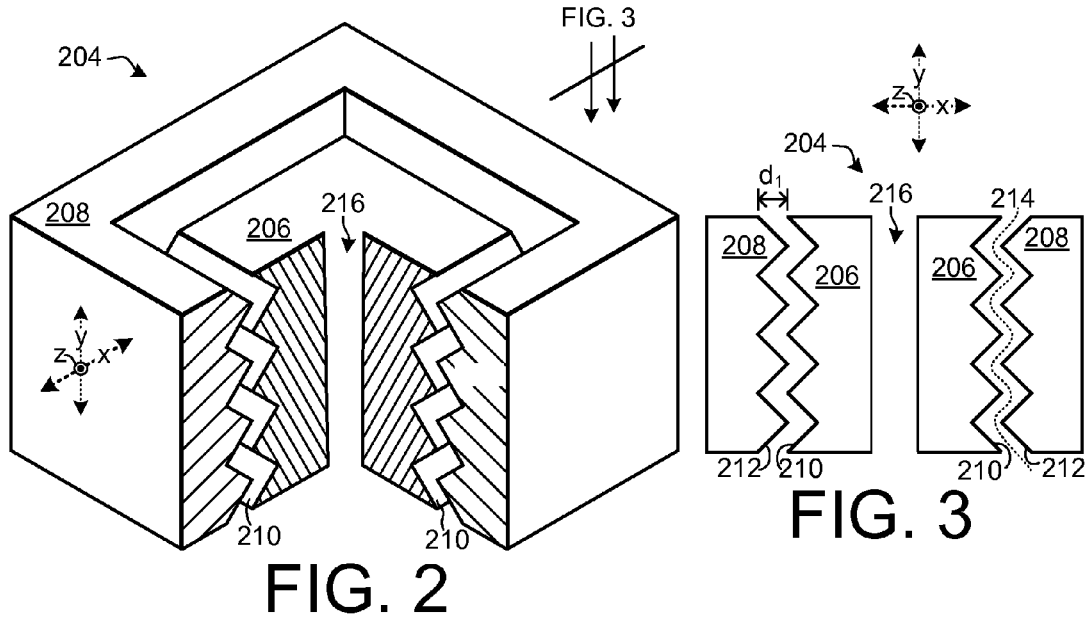
FIG. 2
FIG. 3
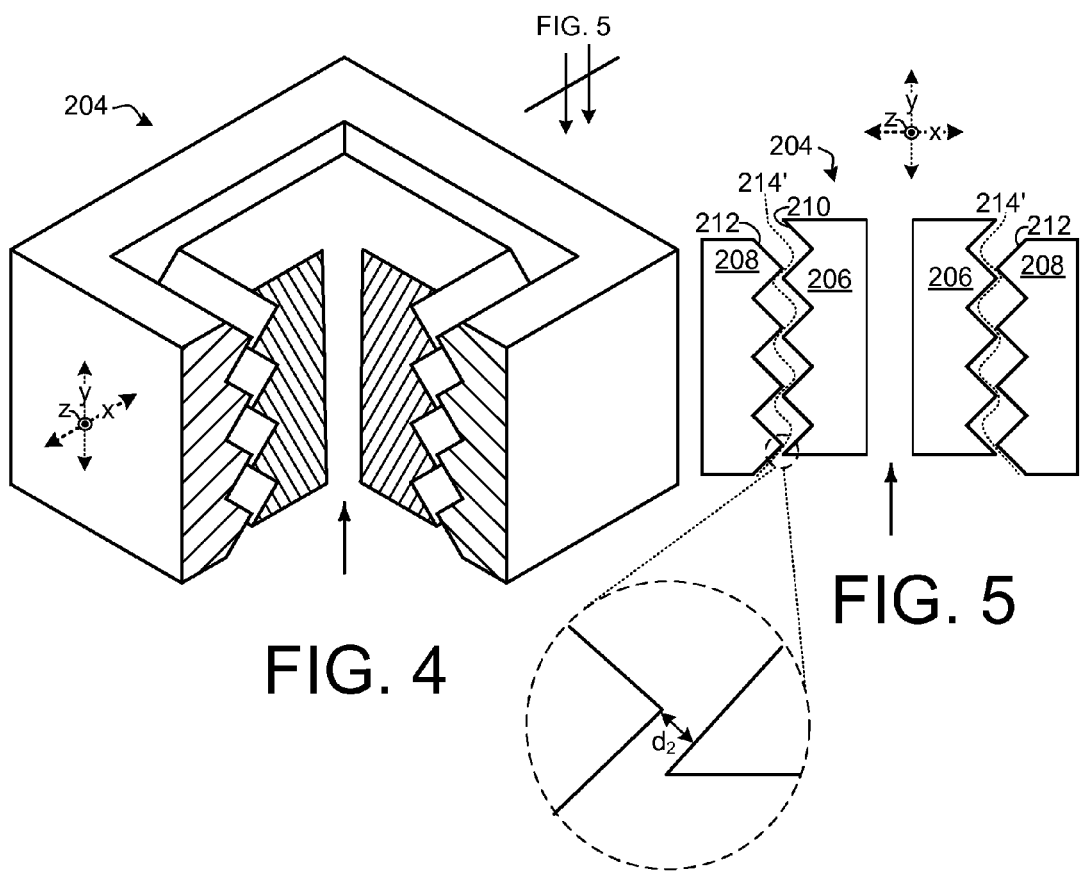
FIG. 4
FIG. 5

WASHBOX

PRIORITY

The present application is a continuation of U.S. application Ser. No. 13/005,415, filed on Jan. 12, 2011, which is a divisional of, and claims priority from, U.S. application Ser. No. 11/858,079, filed on Sep. 19, 2007, all of which are hereby incorporated by reference in their entirety.

BRIEF DESCRIPTION OF THE DRAWINGS

The accompanying drawings illustrate implementations of the present application. Features and advantages of the illustrated implementations can be more readily understood by reference to the following description taken in conjunction with the accompanying drawings.

FIG. 2 illustrates a perspective view of an adjustable washbox in accordance with some implementations of the present concepts.

FIG. 3 illustrates a sectional view of the adjustable washbox of FIG. 2 in accordance with some implementations of the present concepts.

FIG. 4 illustrates a perspective view of an adjustable washbox in accordance with some implementations of the present concepts.

FIG. 5 illustrates a sectional view of the adjustable washbox of FIG. 4 in accordance with some implementations of the present concepts.

Like reference numbers and designations in the various drawings are used wherever feasible to indicate like elements.

DETAILED DESCRIPTION

Overview

Moving bed media filters receive contaminated water and separate contaminants from the water thereby producing filtered or purified water. Contaminants are filtered from the water by passing the water through a moving bed of media, such as sand. Thus, at an interim point, moving bed media filters produce filtered water and contaminated media. Moving bed media filters can employ adjustable washboxes that receive the contaminated media and can separate the contaminants from the media. For instance, the adjustable washbox receives contaminated media and produces relatively clean media and a relatively concentrated waste stream containing the contaminants.

In some cases, the adjustable washbox can define a tortuous pathway along which the media passes. The tortuous pathway can break-up clumps of media and facilitate separation of contaminants from the media. In one example, the contaminated media can be supplied to the top of the tortuous pathway so that the contaminated media falls downward due to gravity. Some of the filtered water can flow through the adjustable washbox in an opposite or counter-current direction to the contaminated media. The counter-current flow of water can separate the contaminants from the media and can carry the contaminants away in what becomes the waste stream. Meanwhile, the now clean media falls from the bottom of the adjustable washbox to be re-utilized in filtering contaminants from newly received contaminated water. The remainder of the filtered water that is not involved in separating the contaminants from the media can be released as effluent.

One aspect of the adjustable washbox is to allow adequate counter-current flow to separate contaminants from the media and to prevent contaminants from passing through the adjustable washbox to reach the filtered water. A potentially countervailing aspect of the adjustable washbox is to produce a relatively high ratio of effluent water versus waste stream water. Stated another way, the adjustable washbox can reduce a percentage of the filtered water that is lost in the waste stream.

The adjustable washbox lends itself to the various conditions that may be encountered in a water filtration system. For example, the properties of the influent water can vary. Alternatively or additionally, the operating parameters of the moving bed media filter can vary. For instance, a contaminant load of the contaminated water received by the moving bed media filter can change over time. The inventive concepts allow the adjustable washbox to compensate for changing operating conditions. For example, in some cases, the tortuous pathway of the adjustable washbox can be redefined for the encountered operating conditions.

Exemplary Washbox Environment

Figure 1:
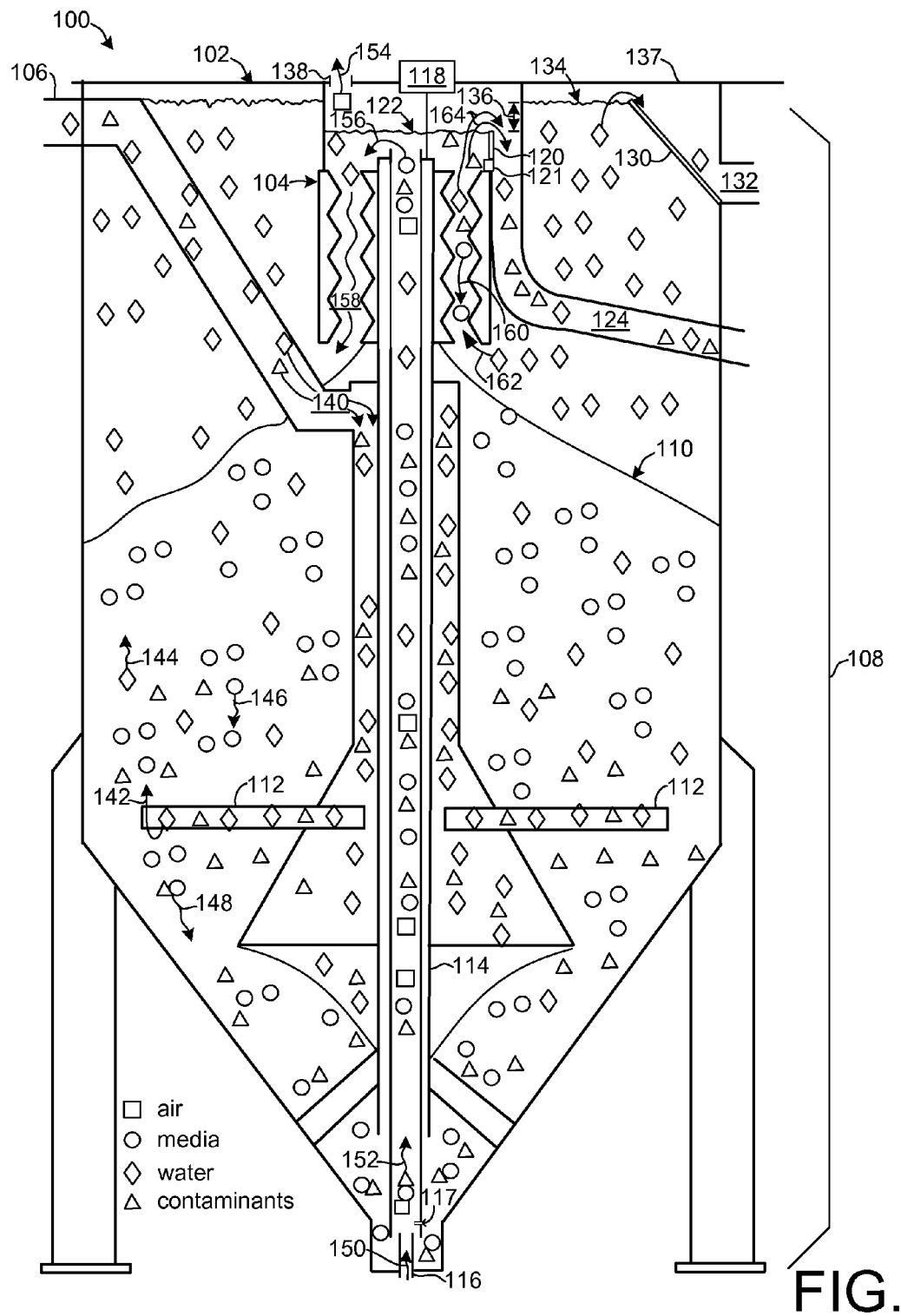
FIG. 1 illustrates a water-treatment system that can employ an adjustable washbox in accordance with some implementations of the present concepts.

FIG. 1 illustrates an example of a moving-bed media filtration system 100 that can employ an adjustable washbox. The moving-bed media filtration system receives contaminated water and separates the contaminants from a majority of the water. The moving-bed media filtration system produces a large percentage of relatively clean effluent water and a small percentage of water concentrated with the contaminants and/or solids in a waste stream.

System 100 includes a vessel 102 associated with an adjustable washbox 104. Vessel 102 receives contaminated water for treatment through an inlet pipe 106. As depicted in FIG. 1 water is represented by a diamond symbol "◊" while contaminants are represented by a triangle symbol "Δ". Vessel 102 includes a filter chamber 108 that contains a media bed 110 with individual media represented by a circle symbol "○". Inlet pipe 106 extends down into filter chamber 108 to discharge the contaminated water into a central portion of media bed 110 through a distribution mechanism. In this instance, the distribution mechanism is in a form factor of a perforated manifold 112.

In this case, a recirculation or airlift tube 114 generally extends from the bottom to the top of filter chamber 108 at the center of vessel 102. An orifice 116 positioned below recirculation tube 114 allows compressed air to be supplied to vessel 102. As depicted in FIG. 1 air is represented by a square symbol "□". Orifice 116 can be positioned so that released compressed air tends to travel up into the recirculation tube 114 rather than outside of the recirculation tube and into media bed 110. In an alternative configuration, compressed air can be supplied via a conduit (not shown) that runs down through the vessel generally coextensive to recirculation tube 114. The conduit provides the compressed air to an orifice(s) 117 that can release the compressed air into, or proximate to, the recirculation tube 114. In either scenario, the released air rises within the recirculation tube 114 to its upper end which is proximate to adjustable washbox 104.

In this case, adjustable washbox 104 includes a washbox configuration adjustment mechanism 118 for adjusting one or more parameters of the washbox as will be described below. Further, in this implementation, the adjustable washbox includes a water control mechanism in the form of a weir 120 and a weir control mechanism 121. The weir 120 physically blocks water above the adjustable washbox 104. The weir control mechanism 121 can adjust weir parameters, such as a height of weir 120 to control a water level 122 above the adjustable washbox. In other implementations, washbox configuration adjustment mechanism 118 can control the operation of weir 120 rather than having a dedicated weir control mechanism.

The adjustable washbox 104 functions to break-up any clumps of media that enter the washbox and/or to further separate solids and/or contaminants from the media. A waste stream outlet 124 carries the separated solids and/or contaminants from the vessel 102. System 100 also includes a water control mechanism in the form of a weir 130 for controlling outflow of filtered water via an outlet 132. Stated another way, weir 130 defines a water level 134 of the filter chamber 108 excluding the water level 122 controlled by weir 120. A head pressure or difference 136 between the washbox water level 122 and the filter chamber water level 134 causes water to flow upward from filter chamber 108 through the adjustable washbox 104. Further, in this instance, vessel 102 includes an upper or top member 137 that seals the vessel and a gas outlet 138 positioned in the top member 137. In other implementations, vessel 102 does not include a top member and is directly open to the atmosphere. To summarize, the media bed 110 utilizes media to separate or filter solids and/or contaminants from the inflowing water. The adjustable washbox 104 then utilizes a relatively small percentage of the filtered water to separate the solids and/or contaminants from the media. The media is then recycled back to the media bed for further use.

In operation, contaminated water enters vessel 102 via inlet pipe 106. The contaminated water passes downward through the inlet pipe as indicated by arrows 140. The contaminated water flows from the inlet pipe and into perforated manifold 112. The contaminated water exits the perforated manifold into media bed 110 as indicated by arrow 142. A majority of the water flows upward through the media bed as indicated by arrow 144 while media moves downward as indicated by arrow 146. Contaminants and/or solids tend to be retained in the media bed and carried downward with the media as indicated by arrow 148. System 100 is an "upflow" system meaning the water released from manifold 112 generally flows upward. However, the adjustable washbox concepts described herein can be employed with a downflow system and/or other systems.

Compressed air supplied to vessel 102 via orifice 116 forms air bubbles that are less dense than the surrounding media and water. The air bubbles rise upwardly as indicated by arrow 150 and carry media, contaminants, and/or solids upwardly into recirculation tube 114 as indicated by arrow 152. A scouring action occurs as the air bubbles, media, contaminants, and/or solids rise up the recirculation tube. The scouring action tends to cause the contaminants and/or solids to be dislodged and/or separated from the media. Upon arrival at the top of the recirculation tube, the air bubbles tend to rise up and leave the vessel through the gas outlet 138 as indicated by arrow 154. The media is relatively dense and tends to fall down around the mouth of the recirculation tube and into the adjustable washbox 104 as indicated by arrow 156.

Contaminants and/or solids tend to be less dense than the media and as such tend to float on the water above the adjustable washbox 104. Some of the contaminants and/or solids may still be in some way attached to, or associated with, the media and as such tend to be carried downward with the media into the adjustable washbox. The adjustable washbox can function to break up clumps of media and/or to separate contaminants and/or solids from the media. In this case the adjustable washbox defines a tortuous pathway as indicated by arrow 158. The relatively dense media falls downward along tortuous pathway 158 as indicated by arrow 160. Because of head pressure 136, water tends to flow upwardly from the filter chamber 108 along tortuous pathway 158 as indicated by arrow 162. Accordingly, the water creates a countercurrent flow to the descent of the media. Functionally, the countercurrent flow and/or interactions of the descending media with washbox surfaces defining the tortuous pathway 158 can cause clumps of media to be broken up and contaminants and/or solids to be carried upwardly with the water. Water, contaminants and/or solids flow over weir 120 as indicated by arrows 164 to form a waste stream that is removed via waste stream outlet 124.

Several environmental variables or parameters can affect the performance of system 100. For instance, these environmental parameters can include a rate of inflow of the contaminated water and an amount of the contaminants and/or solids in the inflowing contaminated water. Several operating parameters of system 100 can be adjusted to compensate for changes to one or more of these environmental parameters. For example, one operating parameter that can be adjusted is the rate at which the compressed air is introduced into the vessel via orifice 116. The rate that the compressed air is introduced can be adjusted to slow or speed the rate at which the media is removed from filter bed 110 and delivered to adjustable washbox 104. For instance, increasing the rate for the compressed air increases the rate at which media is drawn from the media bed 110 and delivered to the adjustable washbox 104 via the recirculation tube 114. Another operational parameter value that can be adjusted is the difference in head pressure 136 between the washbox water level 122 and the filter chamber water level 134. Increasing the difference in head pressure can increase counter-current water flow through the adjustable washbox 104. The adjustable washbox can be adjusted to handle the environmental parameters and/or operational parameters that affect washbox function.

For purposes of explanation, consider a hypothetical scenario where the rate of inflow to the system 100 stays relatively constant but the contaminant and/or solids load of the inflow increases. The increased contaminants and/or solids are filtered by the media bed 110. The volume of air supplied to the system can be increased in order to speed media movement and cleaning. Cleaning the media more frequently can reduce a likelihood of the media bed 110 becoming clogged due to the increased contaminant and/or solids load. The increased air serves to increase the rate at which media is drawn into and carried up the recirculation tube 114. Thus, media is delivered to the adjustable washbox 104 at an increased rate. The media falls down through the countercurrent flow of the adjustable washbox. However, if the amount of media falling through the adjustable washbox is too large, then the media may plug the adjustable washbox and/or block the countercurrent flow of water thereby allowing solids and/or contaminants to pass through the adjustable washbox into the relatively clean filtered water above the media bed 110. To avoid such a scenario, one or more parameters or properties of the adjustable washbox can be adjusted via washbox configuration adjustment mechanism 118 and/or the height control mechanism 121 to compensate for the increased amount of media entering the adjustable washbox.

Similarly, parameters of the adjustable washbox 104 can be adjusted in an instance where the amount of media entering the adjustable washbox decreases due to a decreased contaminant and/or solids load in the incoming water received by system 100. In this latter scenario the adjustable washbox can enable less water to be counter-flowed through the washbox thereby increasing a relative percentage of effluent water produced from the inflow. In summary, the adjustable washbox enables adjustment of washbox parameters responsive to changes to environmental parameters and/or other operation parameters.

In some implementations, the washbox configuration adjustment mechanism 118 and/or the weir control mechanism 121 can be electronically coupled to receive data related to one or more sensors associated with system 100. The washbox configuration adjustment mechanism and/or the weir control mechanism can automatically adjust the adjustable washbox based at least in part upon the data. For instance, washbox configuration adjustment mechanism 118 can receive data indicating that the rate at which compressed air is introduced via orifice 116 has been increased or decreased and can correspondingly adjust the configuration of the adjustable washbox. For instance, the washbox configuration adjustment mechanism 118 can cause media to pass more easily through the adjustable washbox responsive to an increased air flow rate. The washbox configuration adjustment mechanism 118 can then cause the weir control mechanism 121 to lower weir 120 thereby increasing water flow through the washbox to ensure adequate media cleaning.

First Exemplary Adjustable Washbox

Figure 6:
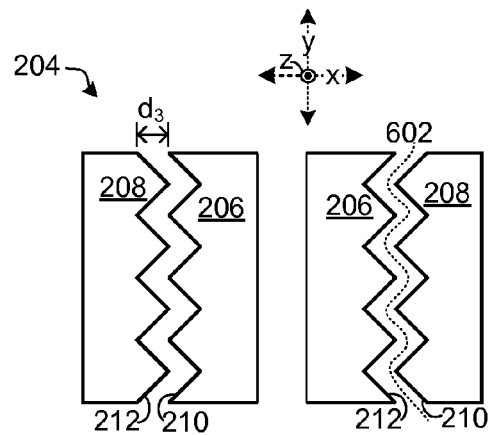
FIGS. 6-8 illustrate sectional views of an adjustable washbox in accordance with some implementations of the present concepts.
Figure 7:
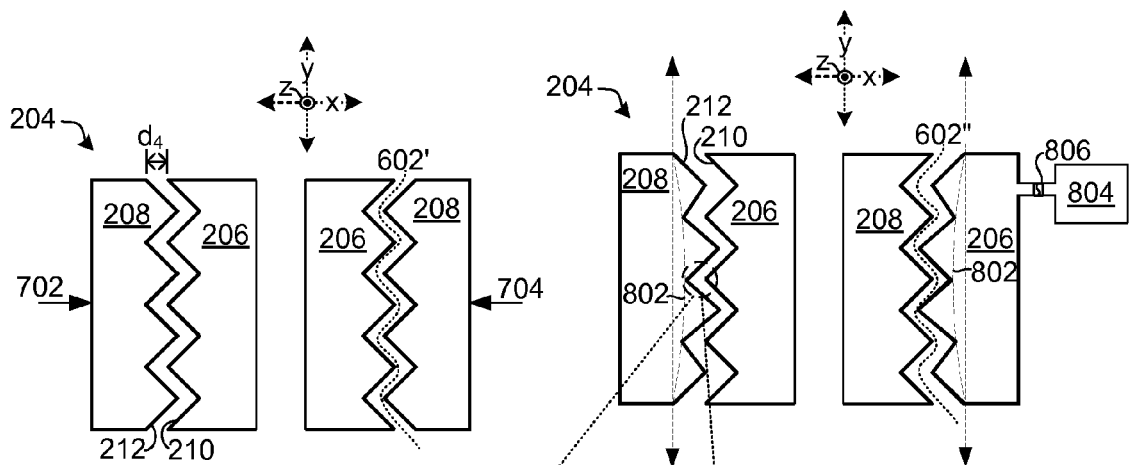
Figure 8:
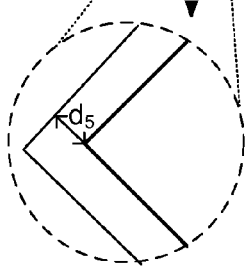

FIGS. 2-5 collectively show an adjustable washbox 204 that is suitable for use with a moving bed media system such as system 100 described above in relation to FIG. 1. FIGS. 6-8 show further variations of adjustable washbox 204. FIG. 2 shows a perspective view of washbox 204 in a first configuration. FIG. 4 shows a perspective view of washbox 204 in a second configuration. FIGS. 3 and 5 offer sectional views of the washbox configurations illustrated in FIGS. 2 and 4 respectively.

In this case, adjustable washbox 204 includes an inner portion 206 nested within an outer portion 208. An outward facing surface 210 of the inner portion and an inner facing surface 212 (specifically designated in FIG. 3) of the outer portion defines a tortuous pathway 214 (specifically designated in FIG. 3). A central cavity 216 is provided through inner portion 206 to receive a recirculation tube (described with specificity above in relation to FIG. 1). Media carried up through the central cavity 216 falls down through tortuous pathway 214 due to gravity.

Adjustable washbox 204 is configured to allow one or more washbox parameters to be adjusted during operation. For instance, in the illustrated configuration of FIGS. 2-6, the adjustable washbox parameter relates to a minimum dimension or distance of the tortuous pathway as measured between the opposing inner and outer facing surfaces 212, 210. In this case, when the adjustable washbox is in the first configuration of FIGS. 2-3 a minimum dimension $d_1$ is defined between the opposing inner and outer facing surfaces 212, 210.

In the second configuration of FIGS. 4-5 the inner portion is moved parallel to the vertical or y-axis in an upward direction and a minimum dimension $d_2$ is defined between the opposing inner and outer facing surfaces 212, 210. In other configurations, either or both of the inner and outer portions 206, 208 can be moved relative to one another. In this case, dimension $d_2$ is less than dimension $d_1$. The smaller dimension $d_2$ makes tortuous pathway 214' more constrained in the second configuration than in the first configuration. The more constrained pathway can cause slower media descent through tortuous pathway 214' and/or cause more effective breakup of any clumps of media passing along the tortuous pathway 214'. Slower media descent prolongs the media's exposure to the counter-current flow and thereby increases contaminant removal from the media. Further, the more constrained tortuous pathway 214' can allow for reduced water usage and/or increased water velocity in the counter-current flow through the adjustable washbox 204 than tortuous pathway 214 of the less constrained first configuration.

The dimensions $d_1$, $d_2$ can be selected relative to the size of the media. For instance, in one implementation that utilizes approximately 0.01 inch media, dimension $d_2$ can be in a range slightly larger than the media, such as in a range of about 0.02 inches to about 0.05 inches. Similarly, dimension $d_1$ can be in a range of about 0.1 to about 0.3 inches.

While first and second configurations are illustrated in FIGS. 2-3 in comparison to FIGS. 4-5 the skilled artisan should recognize that in at least in some implementations, the adjustable washbox can be adjusted to an essentially infinite number of configurations. Further, the adjustable washbox can be generally continuously adjusted or reconfigured responsive to the encountered conditions or parameters.

Building upon the above description, FIGS. 6-8 offer two implementations where a different parameter of the adjustable washbox 204 is adjusted that affects the washbox's tortuous pathway. FIGS. 6-8 are sectional views with FIG. 6 being similar to the view of FIG. 3. As represented in FIG. 6, the adjustable washbox 204 is in a first configuration that defines a tortuous pathway 602 (only designated with specificity on the right hand portion of adjustable washbox 204). In the example of FIG. 7 the adjustable washbox's outer portion(s) 208 is moved inwardly parallel to the x-axis as indicated by arrows 702, 704 to create a second configuration. (While in the sectional view of FIG. 7, the outer portions appear as two distinct components, in some instances the outer portions are formed by a single component that surrounds the inner component). Moving the outer portion(s) inwardly further constrains a tortuous pathway. In this case, the tortuous pathway is further constrained in that the minimum dimension of the tortuous pathway measured parallel to the x-axis is reduced from distance $d_3$ represented in FIG. 6 to distance $d_4$ represented in FIG. 7. Accordingly, tortuous pathway 602' of the second configuration illustrated in FIG. 7 is more constrained than tortuous pathway 602 defined in the first configuration of FIG. 6. While in this instance, the second configuration of FIG. 7 is achieved by moving the outer portion, other implementations can move either or both of the inner and outerportions 206, 208 respectively.

In the implementation of FIG. 8, the outer portion's inner surface 212 is distended toward the inner portion 206 as evidenced by arc 802. This distension creates a minimum distance $d_5$ along the tortuous pathway that is less than distance $d_3$ designated in FIG. 6. Accordingly, the adjustable washbox configuration of FIG. 8 offers a more constrained tortuous pathway than the configuration of FIG. 6. Similar distention can alternatively or additionally be created on the inner portion 206. Various techniques can be utilized to distend the washbox surfaces that define the tortuous pathway. For instance, hydraulic or pneumatic forces applied within the inner and/or outer portions 206, 208 can create the distention. Alternatively, a horizontally mounted ram within the inner and/or outer portions can create the distension. In this case, a hydraulic pump 804 pressurizes and depressurizes the outer portion 208 as controlled by a valve 806 to change the adjustable washbox's configuration.

Adjustable washboxes can be made from a wide range of materials such as metals, resin based-materials such as fiberglass, and various plastics, among others. Materials that tend to be relatively more flexible and less brittle can be employed for distensible adjustable washboxes, such as the implementation described above in relation to FIG. 8.

Second Exemplary Adjustable Washbox

Figure 9:
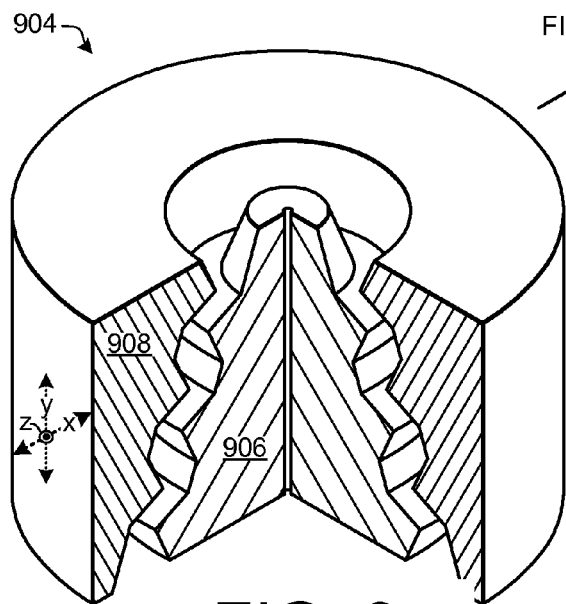
FIG. 9 illustrates a perspective view of an adjustable washbox in accordance with some implementations of the present concepts.
Figure 10:
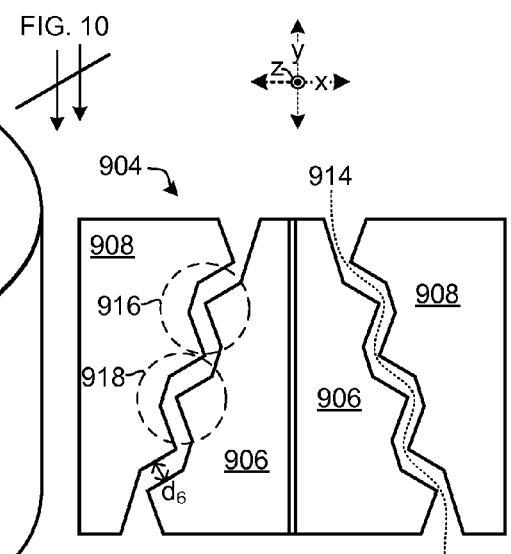
FIG. 10 illustrates a sectional view of the adjustable washbox of FIG. 9 in accordance with some implementations of the present concepts.
Figure 11:
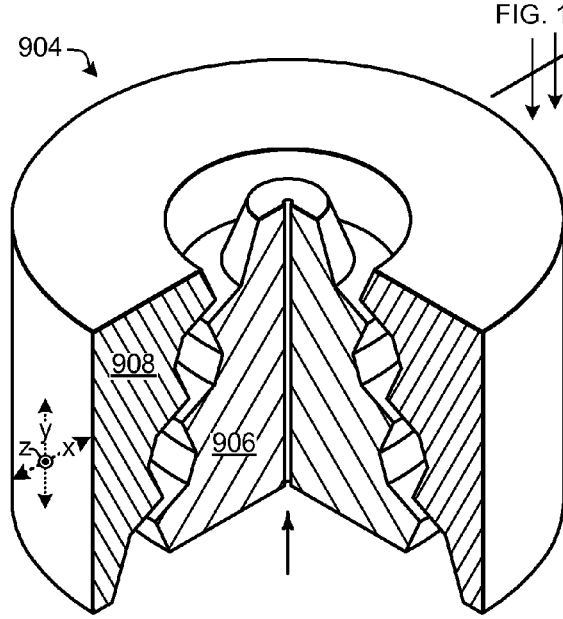
FIG. 11 illustrates a perspective view of an adjustable washbox in accordance with some implementations of the present concepts.
Figure 12:
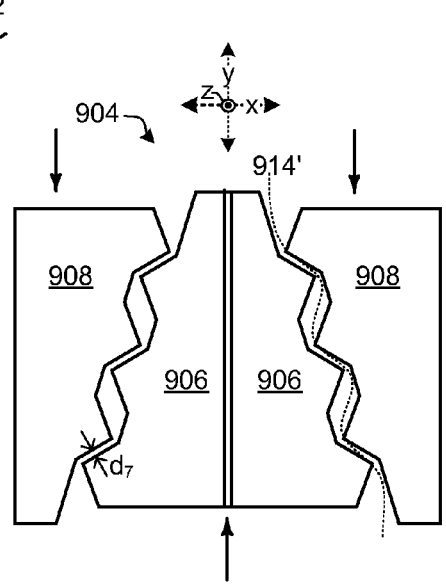
FIG. 12 illustrates a sectional view of the adjustable washbox of FIG. 11 in accordance with some implementations of the present concepts.

FIGS. 9-12 illustrate another adjustable washbox 904. FIGS. 9 and 10 represent the adjustable washbox in a first configuration while FIGS. 11-12 represent the adjustable washbox in a second configuration. In this implementation, adjustable washbox 904 includes inner and outer portions 906, 908 defining a tortuous pathway therebetween. In the first configuration of FIGS. 9-10 the tortuous pathway is designated as 914 and in the second configuration of FIGS. 11-12 the tortuous pathway is designated as 914'. In this case, when considered from end to end, the tortuous pathway flows in a direction that is oblique relative to the vertical or y-axis. Further, the tortuous pathway includes a series of descending steps such as are designated at 916 and 918. These descending steps can serve to breakup clumps of media that may enter the adjustable washbox 904. Further, by moving, either of the inner and/or outer portions 206, 208 relative to one another parallel to the y-axis creates the second configuration and redefines the tortuous pathway. For instance, in this case, in the second configuration, at least portions of the adjustable washbox's tortuous pathway 914' are more constrained than in the first configuration 914. For example, dimension $d_6$ of the first configuration is greater than corresponding dimension $d_7$ of the second configuration. The more constrained configuration can breakup media clumps and/or provide a restriction to counter-current water flow that allows the adjustable washbox to operate utilizing less counter-current water flow and/or to achieve higher flow velocities.

Third Exemplary Adjustable Washbox

Figure 13:
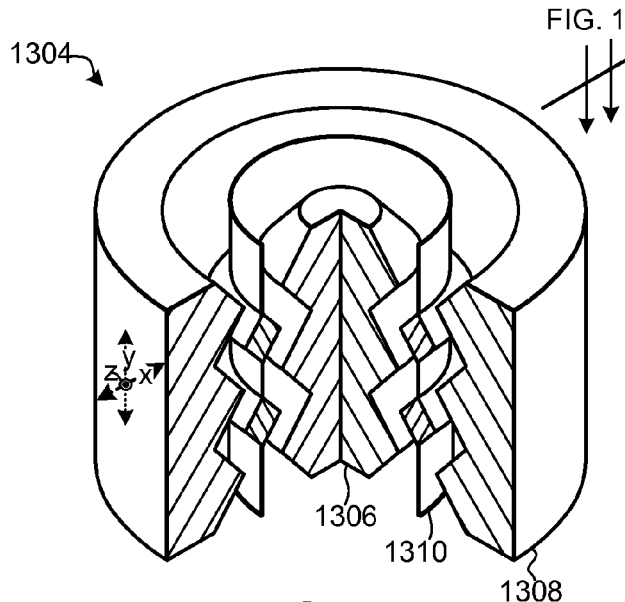
FIG. 13 illustrates a perspective view of an adjustable washbox in accordance with some implementations of the present concepts.
Figure 14:
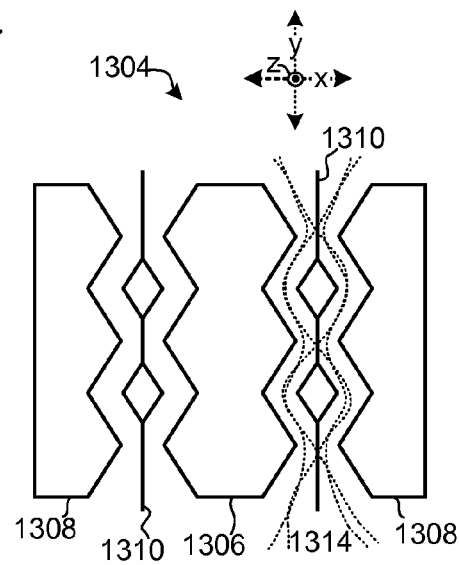
FIG. 14 illustrates a sectional view of the adjustable washbox of FIG. 13 in accordance with some implementations of the present concepts.
Figure 15:
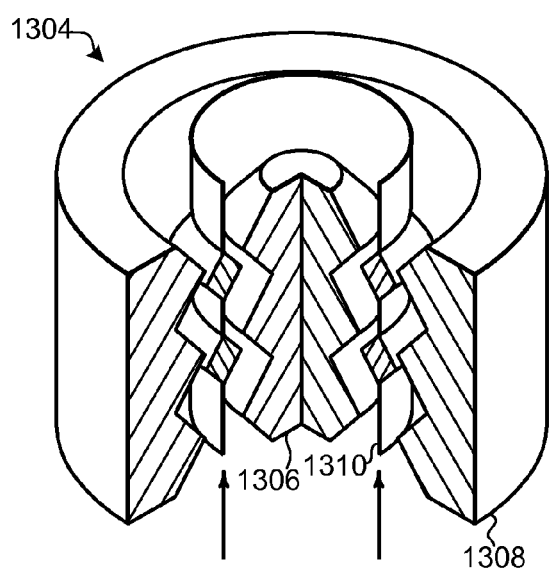
FIG. 15 illustrates a perspective view of an adjustable washbox in accordance with some implementations of the present concepts.
Figure 16:
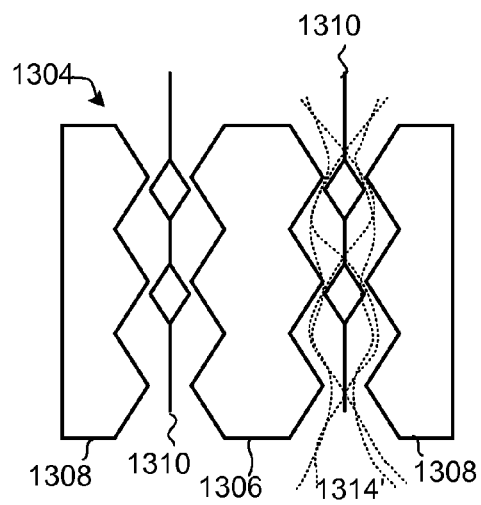
FIG. 16 illustrates a sectional view of the adjustable washbox of FIG. 15 in accordance with some implementations of the present concepts.

FIGS. 13-16 illustrate still another adjustable washbox 1304. FIGS. 13 and 14 represent the adjustable washbox in a first configuration while FIGS. 15-16 represent the adjustable washbox in a second configuration. In this case, adjustable washbox 1304 includes inner and outer portions 1306, 1308 and an interposed portion 1310. A tortuous pathway is defined by the inner, outer and interposed portions. In the first configuration of FIGS. 13-14 the tortuous pathway is designated as 1314 and in the second configuration of FIGS. 15-16 the tortuous pathway is designated as 1314'. In this case, when considered from end to end, the tortuous pathway flows in a direction that is generally parallel to the vertical or y-axis. The interposed portion 1310 can introduce "sub-paths" to the tortuous pathway and multiple dotted lines are utilized to indicate how particular media particles may fall along the tortuous pathway.

Moving one or more of the inner, outer and interposed portions 1306, 1308, and 1310, respectively can redefine the tortuous pathway (1314, 1314') as can be evidenced by comparing the first configuration of FIGS. 13 and 14 with the second configuration of FIGS. 15 and 16. For instance, consider a scenario where washbox 1304 is operating in an environment with a relatively low contaminant and/or solids load. The relatively low contaminant and/or solids load can enable a relatively low rate that a given volume of media is directed to the adjustable washbox 1304. The adjustable washbox can be set at the second configuration evidenced in FIGS. 15-16 to reduce countercurrent water flow through the washbox. If the rate that media is directed to the adjustable washbox is increased and/or if an obstruction of the media within the adjustable washbox occurs, then the adjustable washbox can be changed to the first configuration illustrated in FIGS. 13-14.

Further, any of the inner, outer and/or interposed portions 1306, 1308, and 1310, respectively can be vibrated to reduce and/or eliminate clogging of media within the adjustable washbox. For instance, consider a scenario where adjustable washbox 1304 is operating in the second configuration of FIGS. 15-16 to reduce water usage. Assume further that a back-up or clogging of media is detected within the adjustable washbox. In such a case, the interposed portion 1310 can be vibrated before reconfiguring the adjustable washbox to a different configuration. Such a technique can facilitate media flow without substantially changing the configuration of the adjustable washbox. Alternatively or additionally, the interposed portion can be moved both vertically parallel the y-axis and vibrationally to facilitate media passage through the adjustable washbox.

Figure 17:
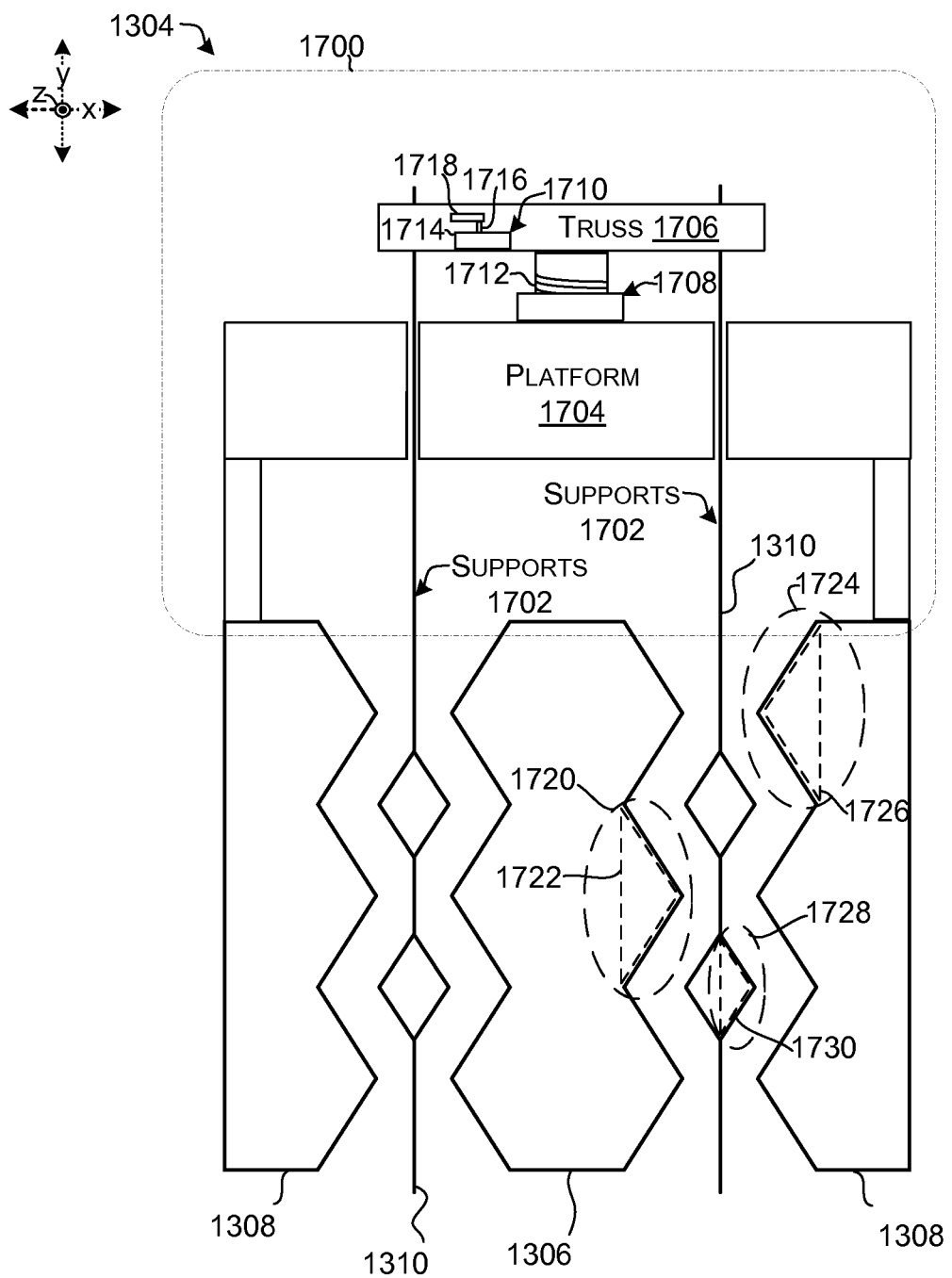
FIG. 17 illustrates a sectional view of an adjustable washbox in accordance with some implementations of the present concepts.

FIG. 17 illustrates a more detailed sectional view of adjustable washbox 1304 that includes a washbox configuration adjustment mechanism 1700. Further examples of washbox configuration adjustment mechanisms are described in relation to FIGS. 1 and 18. In this case, washbox configuration adjustment mechanism 1700 includes supports 1702, a platform 1704, and a truss 1706. Interposed portion 1310 is coupled to supports 1702 that extend upwardly through platform 1704. The supports 1702 are interconnected via truss 1706. The washbox configuration adjustment mechanism 1700 further includes a vertical movement assembly 1708 and a vibration assembly 1710. In this example, the vertical movement assembly 1708 is in the form factor of a motorized screw mechanism 1712 configured to move truss 1706 vertically (parallel to the y-axis) relative to platform 1704. The motorized screw assembly functions to move the interposed portion 1310 vertically relative to the inner and outer portions 1306, 1308 to redefine the tortuous pathway (specifically designated FIGS. 13-16). These (or similar) components can alternatively or additionally be utilized to move one or more of the inner and outer portions 1306, 1308 relative to one another. While a motorized screw assembly is utilized here, other implementations can utilize other mechanisms for moving one portion of the adjustable washbox relative to another portion. For instance, hydraulic cylinders, pneumatics and/or various other assemblies can be utilized as should be recognized by the skilled artisan.

Vibration assembly 1710 functions to provide vibration to the supports 1702 that is then transferred down to the interposed portion 1310 proximate to the inner and outer portions 1306, 1308. As described above, in relation to FIGS. 13-16, the vibration can facilitate media passage through the tortuous pathway. In this instance, the vibration assembly includes a motor 1714 that drives a shaft 1716. A mass such as a metal rod or plate 1718 is mounted in an offset or unbalanced manner on the shaft 1716. When the motor drives the shaft 1716 the spinning plate creates vibration that is transferred to the truss and ultimately to the interposed portion 1310. The skilled artisan should recognize other mechanisms for imparting vibrational energy to the interposed portion.

In washbox 1314 the inner, outer, and interposed portions 1306, 1308, and 1310 approximate portions of triangles to define tortuous pathway (designated with specificity in relation to FIG. 14). For instance, inner portion 1306 includes a protuberance 1720 that approximates a portion of a triangle as indicated at 1722. Similarly, outer portion 1308 includes a protuberance 1724 that approximates a portion of a triangle as indicated at 1726 and interposed portion 1310 includes a protuberance 1728 that approximates a portion of a triangle as indicated at 1730. Other implementations can utilize other shapes to define the tortuous pathway. For instance, other implementations can utilize any combination of triangular shapes and rectangular shapes, elliptical shapes, linear shapes, and irregular shapes, among others to define the tortuous pathway. Further, in this implementation, protuberances on a given portion are generally uniform in size and are similar to protuberances on other portions. For instance, protuberance 1720 is similar in size to protuberance 1724. In other scenarios, protuberances on an individual portion can be of varied sizes. Alternatively or additionally, the protuberances of one portion can be different sizes than protuberances of a different portion.

Additional Exemplary Washbox Environments

While adjustable washbox concepts are introduced above in relation to the specific system environment of FIG. 1, the adjustable washbox concepts described herein are not limited to a particular system. For instance, FIG. 18 illustrates an example of another system environment in which the concepts can be employed.

Figure 18:
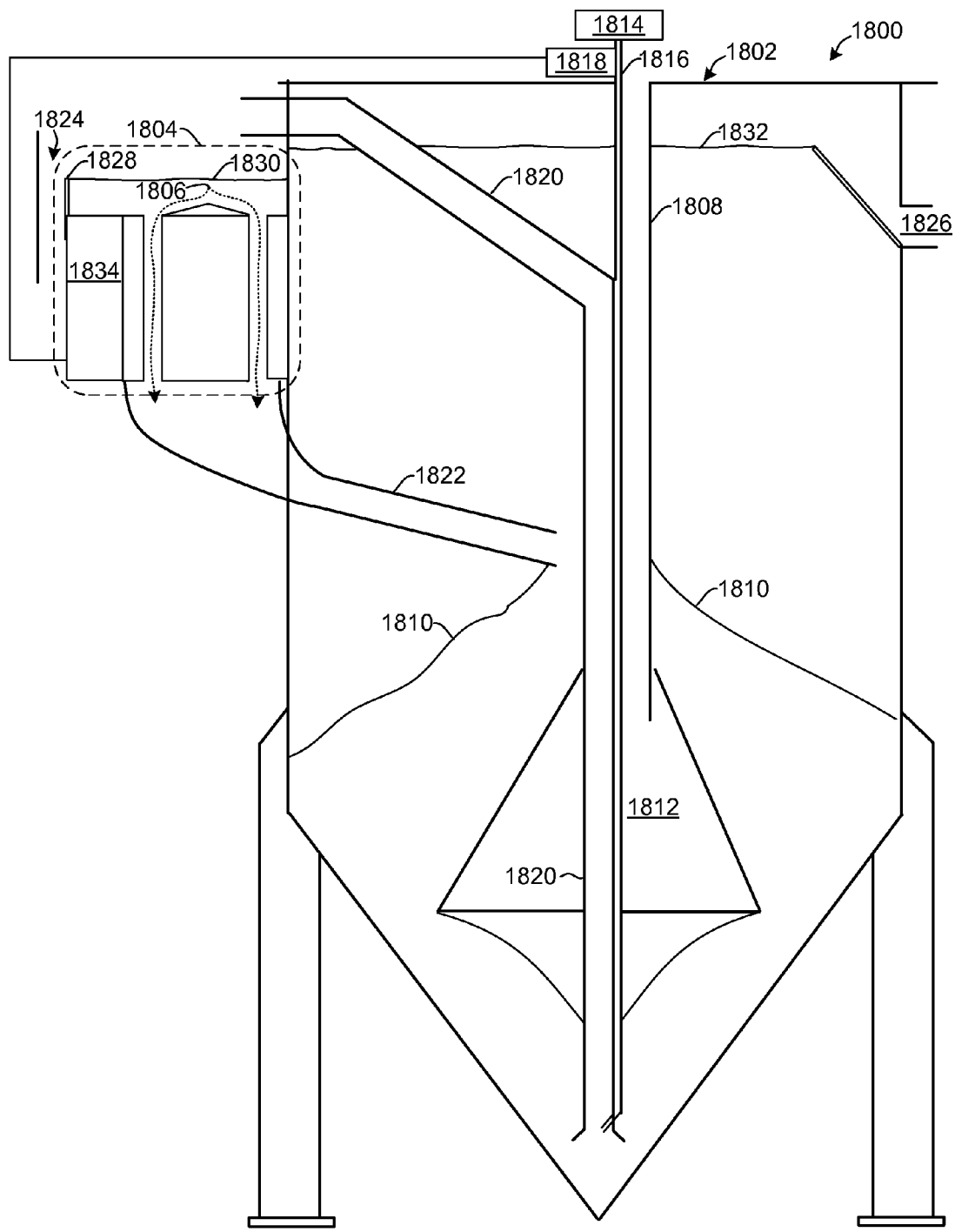
FIG. 18 illustrates a water-treatment system that can employ an adjustable washbox in accordance with some implementations of the present concepts.

FIG. 18 illustrates an example of a moving-bed media filtration system 1800 that can employ an adjustable washbox. System 1800 includes a vessel 1802 associated with an adjustable washbox 1804 that is external to the vessel and that defines a media pathway 1806. The vessel 1802 receives contaminated water for treatment through an inlet pipe 1808. Vessel 1802 contains a media bed 1810 for filtering contaminants and/or solids from contaminated water. Inlet pipe 1808 extends down into vessel 1802 to discharge the contaminated water into a central portion of media bed 1810 through a distribution mechanism 1812.

System 1800 also includes a compressor 1814, an air delivery mechanism 1816, a sensor 1818, and a recirculation tube 1820. The air delivery mechanism 1816 delivers air from compressor 1814 to recirculation tube 1820 proximate to a bottom of media bed 1810. The sensor 1818 senses a rate at which the compressed air is delivered to the media bed. The recirculation tube 1820 extends upwardly from the bottom of media bed 1810 and out through an upper portion of vessel 1802 to supply air, contaminants, solids, water, and media to the adjustable washbox 1804. A relatively faster delivery rate of compressed air to the recirculation tube tends to increase a rate at which the contaminants, solids, water, and media are picked up from the media bed and carried to the adjustable washbox 1804. Conversely, a relatively slower delivery rate of compressed air to the recirculation tube tends to decrease a rate at which the contaminants, solids, water, and media are picked up from the media bed and carried to the adjustable washbox.

Media delivered to adjustable washbox 1804 falls downwardly and enters the media pathway 1806. Media falling along media pathway 1806 is exposed to a countercurrent (i.e., generally opposite direction to the media pathway) of water that separates contaminants and solids from the media. The media that passes through the adjustable washbox along media pathway 1806 is returned to vessel 1802 via media inlet 1822 to be recycled onto the media bed 1810. A relatively concentrated stream of rejects that includes water, contaminants and/or solids exits the system via reject outlet 1824. Filtered water exits via effluent outlet 1826.

A weir 1828 determines a water level 1830 above the adjustable washbox 1804 relative to a water level 1832 within vessel 1802. The adjustable washbox also includes a washbox configuration adjustment mechanism 1834 for adjusting one or more parameters of the washbox. In this case, washbox configuration adjustment mechanism 1834 is coupled to weir 1828 effective to adjust various parameters associated with the weir, such as a weir height. Washbox configuration adjustment mechanism 1834 is also communicatively coupled to sensor 1818. The washbox configuration adjustment mechanism 1834 can adjust washbox parameters based upon data received from sensor 1818, among others. For instance, as mentioned above the rate at which media is delivered to the adjustable washbox is influenced by the rate at which compressed air is delivered to the recirculation tube 1820. In some implementations, the washbox configuration adjustment mechanism 1834 can raise or lower weir 1828 responsive to changes in the rate at which compressed air is delivered to the recirculation tube.

For purposes of explanation consider a hypothetical scenario where sensor 1818 indicates an increased air delivery rate. The washbox configuration adjustment mechanism 1834 can lower weir 1828. Lowering weir 1828 increases a difference between the adjustable washbox's water level 1830 and the vessel's water level 1832. The increased difference can increase the countercurrent flow rate from vessel 1802 into and through adjustable washbox 1804. The increased countercurrent flow can help to reduce contaminants passing through the adjustable washbox.

Alternatively or additionally to raising or lowering the weir height, the washbox configuration adjustment mechanism 1834 can adjust media pathway 1806 based upon a rate at which the media is received. For instance, the washbox configuration adjustment mechanism can cause the media pathway 1806 to be more or less constrained or constricted.

For instance, continuing with the above-mentioned hypothetical, responsive to an increased rate that media is delivered to the adjustable washbox 1804, the washbox configuration adjustment mechanism 1834 can lower weir 1828 and cause media pathway 1806 to be less constricted. Lowering the weir increases countercurrent water flow along media pathway 1806. Causing the media pathway to be less constrained provides sufficient room within the media pathway to allow for both increased media passage and increased counter-flowing water. The above hypothetical scenario involves but one possible scenario. The washbox configuration adjustment mechanism can receive sensed data from other types of sensors and/or control other adjustable washbox parameters to those described above. The skilled artisan should recognize other environments in which the adjustable washbox concepts can be employed.

Exemplary Method

Figure 19:
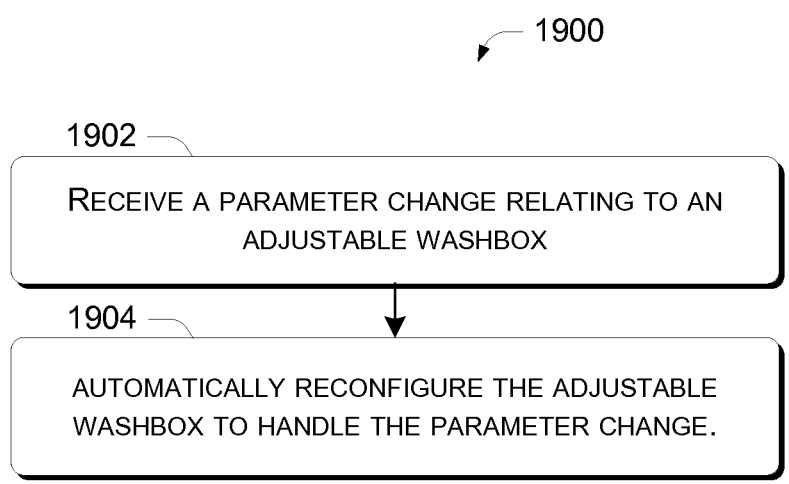
FIG. 19 is a flow diagram of an exemplary method for reconfiguring an adjustable washbox in accordance with some implementations of the present concepts.

FIG. 19 shows an exemplary process or method 1900 for reconfiguring an adjustable washbox. This method 1900 may be implemented in connection with any suitably configured water processing system. Non-limiting examples of suitable water processing systems are described above in relation to FIGS. 1 and 18.

The order in which the method 1900 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device, causes the computing device to perform the method.

At block 1902, a parameter change relating to an adjustable washbox is received. In one scenario the parameter change relates to an operating environment of the adjustable washbox. For instance, the parameter change can relate to a rate at which waste water is received for treatment and/or can relate to a contaminant and/or solids load of the wastewater. In another instance, the parameter change can relate to a rate at which media is delivered to the adjustable washbox.

At block 1904, the adjustable washbox is automatically reconfigured to handle the parameter change. In some implementations the adjustable washbox defines a tortuous pathway within which media is cleaned of contaminants. The automatically reconfiguring can relate to redefining the tortuous pathway. For instance, the adjustable washbox can be reconfigured to make the tortuous pathway more or less constrictive corresponding to the parameter change. In some instances the adjustable washbox can include a mechanism to accomplish the reconfiguring. Non-limiting examples of mechanisms for reconfiguring the adjustable washbox are described above in relation to FIGS. 1, 8, and 17.

CONCLUSION

Although exemplary techniques, methods, devices, systems, etc., relating to adjustable washboxes have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method, comprising:
   receiving a parameter change relating to an operating environment that includes an adjustable washbox, wherein the washbox comprises an outer portion and an inner portion nested within the outer portion, and wherein:
   an inner surface of the outer portion and an outer surface of the inner portion define a tortuous media pathway, and
   at least one of the outer portion is movable relative to the inner portion or the inner portion is movable relative to the outer portion, and,
   automatically reconfiguring the adjustable washbox to handle the parameter change, wherein the automatically reconfiguring comprises automatically adjusting at least one physical dimension to constrict or expand the media pathway.

2. The method of claim 1 wherein automatically reconfiguring comprises one of: making the media pathway more constrictive and making the media pathway less constrictive.

3. The method of claim 1 wherein in an instance where the received parameter change is indicative of media blockage in the media pathway defined by the adjustable washbox, the automatically reconfiguring comprises vibrating at least a portion of the adjustable washbox and in an instance where the media blockage persists after the vibrating, the automatically reconfiguring comprises automatically enlarging the at least one physical dimension of the media pathway.

4. A filtering system, comprising:
   a vessel having an inlet and an outlet and configured to receive contaminated fluid via the inlet;
   a washbox in fluid communication with the inlet, wherein the washbox comprises an outer portion and an inner portion nested within the outer portion, and wherein:
   an inner surface of the outer portion and an outer surface of the inner portion define a media pathway, and
   at least one of the outer portion is movable relative to the inner portion or the inner portion is movable relative to the outer portion;
   a sensor configured to sense one or more conditions in the vessel, the washbox, or the fluid; and
   a washbox adjustment component in communication with the sensor, wherein the adjustment component is configured to constrict or expand a physical dimension of the media pathway in response to the sensed condition.

5. The filtering system of claim 4 wherein the one or more parameters comprises a rate at which contaminated media is introduced into the washbox or a difference in head pressure between a washbox fluid level and a vessel fluid level.

6. The filtering system of claim 4 wherein the one or more conditions in the vessel, the washbox, or the fluid comprises at least one of an amount of a contaminant in the fluid, an amount of solids in the fluid, or a rate of fluid inflow to at least one of the washbox or the vessel.

7. The filtering system of claim 4 wherein the washbox adjustment component is configured to continuously adjust the one or more parameters of the washbox.

8. The filtering system of claim 4 wherein the one or more parameters comprises at least one of an environmental parameter or an operational parameter.

9. The filtering system of claim 4 wherein the washbox further comprises an interposed portion positioned between the inner portion and the outer portion, and wherein at least one of the outer portion, inner portion, and interposed portion is movable relative to the others of the outer portion, inner portion, and interposed portion.

10. The filtering system of claim 4 wherein at least one of the inner portion or outer portion is vibrationally movable.

11. The filtering system of claim 4 wherein at least one of the outer portion or the inner portion is vertically movable.

12. A method of filtering a fluid, the method comprising:
running contaminated media through a media pathway of a washbox, the washbox at least partially within a filtering vessel, wherein a physical dimension of the media pathway is configured to constrict or expand, and wherein:
the washbox comprises an outer portion and an inner portion nested within the outer portion,
at least one of the outer portion is movable relative to the inner portion or the inner portion is movable relative to the outer portion, and
an inner surface of the outer portion and an outer surface of the inner portion define the media pathway; and
filtering a portion of the contaminated media to produce filtered water; and
running at least a portion of the filtered water through the media pathway in a counter-current direction to the contaminated media.

13. The method of claim 12 wherein running contaminated media through the media pathway comprises running contaminated media through a tortuous pathway.

14. The method of claim 12, further comprising carrying contaminants from the contaminated media away from the vessel in a waste stream.

15. A method of filtering a fluid, the method comprising:
running contaminated media through a media pathway of a washbox, the washbox at least partially within a filtering vessel and having an outer portion and an inner portion, and wherein:
an inner surface of the outer portion and an outer surface of the inner portion define the media pathway;
the media pathway has a physically adjustable dimension;
filtering a portion of the contaminated media to produce filtered water;
running at least a portion of the filtered water through the media pathway in a counter-current direction to the contaminated media; and
reconfiguring the media pathway by constricting and/or expanding a physical dimension of the media pathway.

16. The method of claim 1 wherein, the inner surface and the outer surface are reciprocal surfaces.

17. The method of claim 15 wherein the physical dimension is a distance between the inner surface and the outer surface.

18. The method of claim 17 wherein automatically reconfiguring the adjustable washbox comprises automatically increasing or decreasing the distance between the inner surface and the outer surface.

19. The method of claim 1 wherein automatically reconfiguring the adjustable washbox comprises moving at least one of the outer portion and the inner portion relative to the other along a vertical axis of the washbox.

20. The method of claim 1 wherein automatically reconfiguring the adjustable washbox comprises moving at least one of the outer portion and the inner portion relative to the other along a horizontal axis of the washbox.

21. The method of claim 1 wherein automatically reconfiguring the adjustable washbox comprises distending a portion of at least one of the outer portion and the inner portion.

* * * * *